United States Patent
Jain et al.

(10) Patent No.: US 11,935,170 B1
(45) Date of Patent: Mar. 19, 2024

(54) AUTOMATED GENERATION AND PRESENTATION OF SIGN LANGUAGE AVATARS FOR VIDEO CONTENT

(71) Applicant: Amazon Technologies, Inc., Seattle, WA (US)

(72) Inventors: Abhinav Jain, Seattle, WA (US); Avijit Vajpayee, Seattle, WA (US); Vimal Bhat, Redmond, WA (US); Arjun Cholkar, Bothell, WA (US); Louis Kirk Barker, Montara, CA (US)

(73) Assignee: Amazon Technologies, Inc., Seattle, WA (US)

(*) Notice: Subject to any disclaimer, the term of this patent is extended or adjusted under 35 U.S.C. 154(b) by 58 days.

(21) Appl. No.: 17/530,070

(22) Filed: Nov. 18, 2021

(51) Int. Cl.

| G06T 13/40 | (2011.01) |
|---|---|
| G06F 40/20 | (2020.01) |
| G06N 3/08 | (2023.01) |
| G06T 17/00 | (2006.01) |
| G06V 20/40 | (2022.01) |
| G06V 40/16 | (2022.01) |
| G06V 40/20 | (2022.01) |
| G09B 21/00 | (2006.01) |
| G10L 25/63 | (2013.01) |
| H04N 5/272 | (2006.01) |

(52) U.S. Cl.
CPC ............. *G06T 13/40* (2013.01); *G06F 40/20* (2020.01); *G06N 3/08* (2013.01); *G06T 17/00* (2013.01); *G06V 20/46* (2022.01); *G06V 40/174* (2022.01); *G06V 40/28* (2022.01); *G09B 21/009* (2013.01); *G10L 25/63* (2013.01); *H04N 5/272* (2013.01)

(58) Field of Classification Search
CPC ......... G06T 13/40; G06T 17/00; G06T 11/60; G06T 13/205; G06F 40/20; G06F 3/017; G06F 3/167; G06V 40/174; G06V 20/46; G06V 40/28; G06V 20/52; G06N 3/08; G06N 3/045; G09B 21/009; G09B 21/00; G09B 21/006; G01L 25/63; H04N 5/272; H04N 7/15; H04N 21/234336; H04N 21/4884; G10L 15/26; G10L 13/00
See application file for complete search history.

(56) References Cited

U.S. PATENT DOCUMENTS

| 2020/0294525 A1* | 9/2020 | Santos .................... G10L 15/26 |
| 2022/0327309 A1* | 10/2022 | Carlock .................. G06F 40/47 |
| 2022/0343576 A1* | 10/2022 | Marey ................. G10L 15/1815 |

\* cited by examiner

*Primary Examiner* — Xilin Guo
(74) *Attorney, Agent, or Firm* — Eversheds Sutherland (US) LLP

(57) ABSTRACT

Systems, methods, and computer-readable media are disclosed for systems and methods for automated generation and presentation of sign language avatars for video content. Example methods may include determining, by one or more computer processors coupled to memory, a first segment of video content, the first segment including a first set of frames, first audio content, and first subtitle data, where the first subtitle data comprises a first word and a second word. Methods may include determining, using a first machine learning model, a first sign gesture associated with the first word, determining first motion data associated with the first sign gesture, and determining first facial expression data. Methods may include generating an avatar configured to perform the first sign gesture using the first motion data, where a facial expression of the avatar while performing the first sign gesture is based on the first facial expression data.

20 Claims, 10 Drawing Sheets

AUTOMATED GENERATION AND PRESENTATION OF SIGN LANGUAGE AVATARS FOR VIDEO CONTENT

BACKGROUND

Certain digital content, such as movies, television shows, and other video content may include text data, such as text that may be used for subtitles. Some video content may include text that may be used for closed captions or other textual descriptions of video content. Closed captions may describe audio that is presented in the video content. For example, closed captions may describe music or sounds that occur in the video content. However, some users may prefer to view sign language-based captions instead of text-based captions. Such sign language-based captions may therefore improve a user experience for users. Accordingly, automated generation and presentation of sign language avatars for video content may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
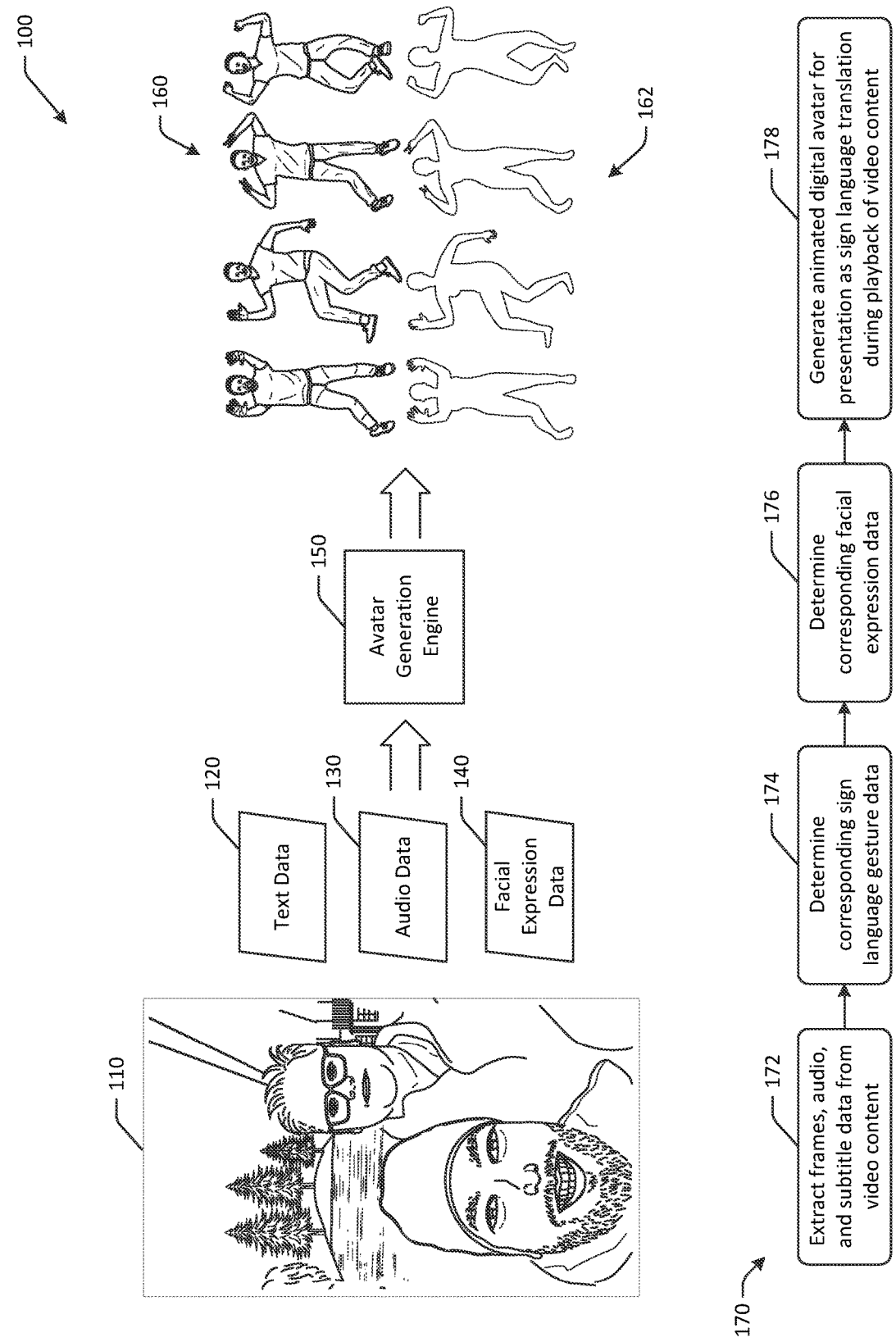
FIG. 1 is a schematic illustration of an example use case for automated generation and presentation of sign language avatars for video content in accordance with one or more example embodiments of the disclosure.

Digital content may include video content, such as movies, television shows, streaming shows (e.g., made for Amazon Prime, Netflix, etc.), and other video content. During consumption of digital content, such as video content, users may utilize text data, such as subtitles or caption data, to improve a user experience. For example, subtitles may aid a user in understanding dialog that occurs in the video content, and/or captions may aid a user in understanding audio and/or dialog that occurs in the video content (e.g., music being played, sound effects, etc.).

However, for some users, sign language may be preferable relative to text-based subtitles for communication. Sign language-based subtitles may therefore be desired. Embodiments of the disclosure include digital avatars that can be automatically generated and presented instead of, or in addition to, text-based subtitles, where the digital avatars perform sign language that corresponds to dialogue spoken by actors in the video content. The digital avatars may be configured to provide facial expressions that communicate emotion in addition to the dialogue, thereby providing a more immersive experience for viewers using the sign language-based avatars. A user experience may therefore be improved by automated generation of avatars configured to perform sign language. Embodiments may implement one or more neural networks and/or machine learning algorithms to determine motion data that can be used to implement avatar sign gesture motion, as well as to provide avatar facial expression functionality. One or more avatars may be presented instead of, or in addition to, subtitles, captions, or other text data. Avatars may be presented during playback of video content.

Some embodiments use natural language processing with subtitles to determine corresponding sign language translations, and other embodiments use machine translation models to translate audio dialogue into a sequence of sign gestures. Sign gestures may be animated using a human body three-dimensional (3D) model.

In some embodiments, content may be separated into segments using one or more video processing algorithms, text processing algorithms, and/or audio processing algorithms to identify and/or determine scenes that may take place in various portions of the content. The identified segments may be analyzed to determine avatars corresponding to the segments (which may or may not be the entire segment).

This disclosure relates to, among other things, devices, systems, methods, computer-readable media, techniques, and methodologies for automated generation and presentation of sign language avatars for video content. Certain embodiments may automatically generate avatars that perform sign language for digital content, such as video content (e.g., movies, television programs, streaming content, etc.), based at least in part on analysis of individual frames of video content, and/or analysis of audio segments. Certain embodiments determine aspects of video content using neural network(s) and/or machine learning and other methodologies. In some instances, machine learning (e.g., deep neural networks, long short term memory units and/or recurrent neural networks, etc.) may be used to identify various elements of video frames that may be used to generate textual descriptions.

In an example embodiment, a deep neural network may be built to generate an avatar that performs sign gestures for a video segment. Individual subtitle data may be generated for some or all frames of the video content. The subtitle data for a scene may be aggregated and reconciled to form a synopsis for the scene. Some embodiments may include facial recognition processing, object detection processing, and/or natural language processing models to refine subtitle data, such as by replacing pronouns or a word associated with gender with character names. Some embodiments may use a gloss process to refine dialogue and/or to find an appropriate sign gesture for a portion of dialogue. For example, a phrase of "Lee went snowmobiling with his best friends in the mountains as the snow fell and the engines roared" may be modified to "Lee went snowmobiling with his buddies." Embodiments of the disclosure may therefore reduce or eliminate manual effort in generating digital avatars for sign language performance of dialog appearing in video content by automatically generating avatars that were previously unable to be generated by computers due to a lack of mapping of sign gestures, motion data, and dialog words/phrases that occur in video content.

Referring to FIG. 1, an example use case 100 for automated generation and presentation of sign language avatars for video content is depicted in accordance with one or more example embodiments of the disclosure. In the example of FIG. 1, video content may include multiple frames, such as a first frame 110, a second frame, and so forth. The video content may be associated with text data 120, such as subtitle data, audio data 130, and facial expression data 140. The text data 120, audio data 130, and facial expression data 140 may be input at an avatar generation engine 150, which may process the respective data to output a digital avatar 162 that performs sign gestures corresponding to a sign language translation of dialogue that appears in the video content. In some embodiments, the digital avatar 162 may be configured to perform a sign gesture based on motion data parameterized from a video of a human 160 performing the sign language gesture.

The avatar generation engine 150 may include one or more neural networks that may be used to analyze the respective frames and to generate a corresponding avatar. The avatar generation engine 150 may therefore optionally extract the frames from the video content, as well as corresponding audio. Using one or more image processing algorithms, the avatar generation engine 150 may optionally detect or otherwise determine facial expressions that appear in the respective frames, actions that occur in the video segment corresponding to a scene, and/or faces that appear in the frames. The avatar generation engine 150 may analyze the corresponding audio to detect or otherwise determine any sounds present in the audio.

As a result, a user consuming the video content may view sign language translations of the dialogue, where the sign language gestures are presented by an avatar, along with facial expressions presented by the avatar that communicate emotion and/or emphasis of the dialogue that is missing from text-based subtitles.

To generate digital avatars that perform sign language gestures, an example process flow 170 is presented and may be performed, for example, by one or more avatar generation engines at one or more remote servers. The remote server and/or computer system may include at least one memory that stores computer-executable instructions and at least one processor configured to access the at least one memory and execute the computer-executable instructions to perform various actions or operations, such as one or more of the operations in the process flow 170 of FIG. 1.

At a first block 172, frames and audio may be extracted from video content. For example, the avatar generation engine 120 may extract frames and audio from video content. At a second block 174, corresponding sign language gesture data may be determined for dialogue presented during a video segment. At a third block 176, corresponding facial expression data may be determined. The facial expression data may represent the facial expressions made by an actor while speaking certain words or phrases that will be presented in sign language. At a fourth block 178, the avatar generation engine may generate an animated digital avatar for presentation as a sign language translation during playback of video content.

Embodiments of the disclosure may include automated generation and presentation of sign language avatars for video content, and may include one or more modules that can be used to analyze digital content. Certain embodiments may use one or more detection modules or algorithms (e.g., object recognition modules, pattern recognition algorithms, etc.) to identify or detect the presence of one or more features in the content. Features may include, for example, the presence of certain objects, the occurrence of certain actions or events, certain sounds in an audio file or audio component of the content, certain language in a text file or text component of the content, and so forth. One or more detection modules may be used to process and/or detect various features in the content. In some instances, a module may perform more than one form of analysis.

Example embodiments of the disclosure provide a number of technical features or technical effects. For example, in accordance with example embodiments of the disclosure, certain embodiments of the disclosure may automatically analyze audio, video, and/or text components of content. Certain embodiments may generate avatars that perform sign language translations for various scenes of video content. Some embodiments may provide search functionality to locate or identify content that includes certain scenes using written or audible (e.g., speech input) descriptions of scenes. Some embodiments may be configured to generate content summaries for content and enable descriptive searching. Certain embodiments may recognize or identify presence of certain objects and/or presence of certain themes or types of content and may use one or more machine learning modules or algorithms. As a result of improved functionality, textual descriptions of video may be generated. Embodiments of the disclosure may improve computing efficiency by reducing a database size of motion data and sign language gestures by providing parameterized model data that can be used to animate digital avatars, resulting in reduced file size. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
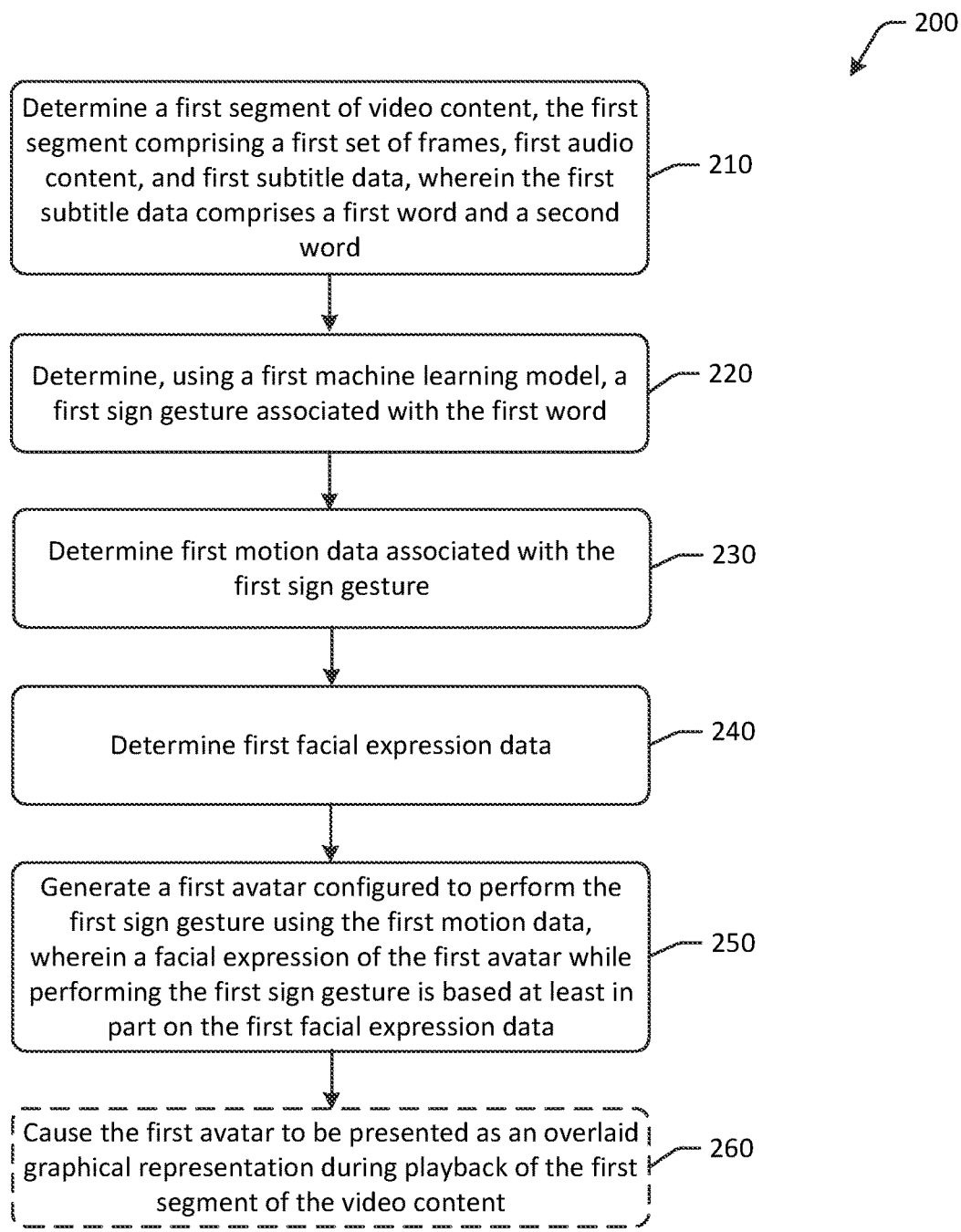
FIG. 2 is a schematic illustration of an example process flow for automated generation and presentation of sign language avatars for video content in accordance with one or more example embodiments of the disclosure.

FIG. 2 depicts an example process flow 200 for automated generation and presentation of sign language avatars for video content in accordance with one or more example embodiments of the disclosure. While example embodiments of the disclosure may be described in the context of movies or other video content, it should be appreciated that the disclosure is more broadly applicable to any type of digital content. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to determine a first segment of video content, the first segment comprising a first set of frames, first audio content, and first subtitle data, wherein the first subtitle data comprises a first word and a second word. For example, a content processing engine and/or one or more video processing modules at a remote server may determine a first segment of video content, the first segment comprising a first set of frames, first audio content, and first subtitle data, wherein the first subtitle data comprises a first word and a second word. The first segment may be a video segment of video content, and may be associated with text and/or audio components. The first segment may be a continuous segment or non-continuous segments that are related. For example, a scene in the content may be interrupted by a flashback or other scene, and may subsequently resume. Segments may correspond to events, scenes, and/or other occurrences that may be discrete and/or extractable from the content. In some instances, segments may correspond to certain locations and/or times, certain actors that appear, certain music or sounds, and/or other features of the content. For example, the remote server may determine a first clip or a first segment of a movie using content data associated with the movie, such as video analysis data. The first clip may be a continuous portion of the movie corresponding to a first scene of the movie that occurs from a first timestamp to a second timestamp. The content scanning engine of the remote server may determine the respective timestamps for segments. Some segments may have more than one set of start and stop timestamps. For example, a scene may be interrupted and then resumed later, in which case there may be more than one pair of start and stop timestamps.

To determine the first segment, the remote server may extract and/or analyze individual frames of video content to determine whether the frames are part of the same segment or a different segment. Analysis of frames may include processing images using one or more object recognition algorithms, determining pixel color values, comparing certain portions of frames to previous or subsequent frames in the video, and the like. In one example, an automobile object recognition algorithm may be used to determine that there is a car present in a first frame of a video. In another example, a firearm detection module or algorithm may be used to determine that gun violence or a firearm is present in a first frame of a video. One or more object recognition algorithms may be used on individual frames or sets of frames in a video. The determined objects or features may be outputs of the respective modules or algorithms.

In some embodiments, the remote server may determine a movie file that includes video data and audio data. The remote server may extract a first video segment from the video data, where the first segment comprising a first frame and a second frame, and first audio content. Corresponding subtitle data and audio data may be determined using the video frame identifiers and/or timestamps.

At block 220 of the process flow 200, computer-executable instructions stored on a memory of a device, such as a remote server or a user device, may be executed to determine, using a first machine learning model, a first sign gesture associated with the first word. For example, the content processing engine and/or one or more video processing modules at a remote server may determine, using a first machine learning model, a first sign gesture associated with the first word. The first sign gesture may be determined using a library or other database that stores sign language identifiers in association with words, phrases, and/or glosses or definitions of words. Machine learning may be used to optimize the contextually relevant selection of sign language identifiers where more than one sign language identifier may be stored in association with a word.

At block 230 of the process flow 200, computer-executable instructions stored on a memory of a device, such as a remote server or a user device, may be executed to determine first motion data associated with the first sign gesture. For example, the content processing engine and/or one or more audio processing modules at a remote server may determine first motion data associated with the first sign gesture. The first motion data may be parameterized motion data or may be raw video data of a human performing a sign gesture. In raw video instances, the video may be analyzed and the human motion may be parameterized. The motion data captured from the human movement may be parameterized and stored in association with a sign identifier. The motion data may be used to determine movement for an animated avatar.

At block 240 of the process flow 200, computer-executable instructions stored on a memory of a device, such as a remote server or a user device, may be executed to determine first facial expression data. For example, the content processing engine and/or one or more neural networks at a remote server may determine first facial expression data. First facial expression data may be determined using one or more of the first set of frames, the audio data, the text data, and/or other associated data. For example, video frames may be processed to determine facial features and/or expressions of an actor that are present while the actor speaks a certain word. In some embodiments, the facial expressions may be classified into sentiment categories. In other embodiments, the facial expressions may be classified into categories and then corresponding facial expressions may be performed by the avatars while the avatar performs a certain sign gesture, so as to communicate emotion. In addition to video processing, facial expression data may be augmented by a volume of the speaker's voice (e.g., if the actor is yelling, etc.), the subtitle data (e.g., punctuation, etc.), other audio or text data, and so forth. In some embodiments, an action and/or human pose detection module may be used to analyze the video and/or audio of the content in a frame-by-frame or segment-by-segment analysis to detect the presence or occurrence of human dialogue. Certain embodiments may include a facial recognition module that may be used to analyze video and/or audio of the content in a frame-by-frame or segment-by-segment analysis to detect the presence of characters in frames or scenes. The first neural network may be a two-dimensional convolutional neural network in some embodiments.

At block 250 of the process flow 200, computer-executable instructions stored on a memory of a device, such as a remote server or a user device, may be executed to generate a first avatar configured to perform the first sign gesture using the first motion data, wherein a facial expression of the first avatar while performing the first sign gesture is based at least in part on the first facial expression data. For example, an avatar generation engine at a remote server may generate a first avatar configured to perform the first sign gesture using the first motion data, wherein a facial expression of the first avatar while performing the first sign gesture is based at least in part on the first facial expression data. The avatar may be a digital avatar presented as a graphical overlay during playback of the video content. The avatar may perform a sequence of sign gestures as the content is played back. Various video processing features, such as smoothing, may be used to provide a seamless and integrated animation of the avatar as the sign gestures are presented. In some embodiments, the first avatar may have a user-customizable appearance, as discussed with respect to FIGS. 6-8. In some embodiments, the first avatar may be presented instead of subtitles and/or closed captions during playback of the first segment of the video content. The avatar may be presented as a first animated video clip that includes the first avatar performing the first sign gesture with the first facial expression data.

In some embodiments, audio content associated with the content may be used in addition to, or instead of, text content to determine sentences that occur in a segment. For example, a remote server may analyze an audio file corresponding to a video. The audio file may include audible sounds, such as dialog, sound effects, soundtrack music, and the like corresponding to the video component of the video. For example, audio may be processed to extract dialog (e.g., filtered to remove sound effects, music, etc.), and the extracted dialog may be processed using speech-to-text processing algorithms. The output may be processed using natural language processing. In an example, an audio processing module may be used to determine the presence of dialog, sound effects, and other instances of audio events that may be used to determine themes of content in a segment. For example, the audio processing module may parse or segment audio associated with the content and identify events or instances of certain indicators or occurrences, such as ocean waves, fire trucks, ambulances, screams, and other audio that may be indicative of actions or events occurring during the segment.

In some embodiments, audio content may be segmented into one or more discrete portions for classification and/or analysis. For example, segments may be classified as music, dialog, sound effects, and so forth. Differently classified portions may be analyzed using different signal processing and/or speech-to-text profiles. In some embodiments, natural language processing may be used to determine a meaning of certain portions of audio. In one example, an audio processing algorithm may be used to determine presence of an explosion feature in the audio file.

At optional block 260 of the process flow 200, computer-executable instructions stored on a memory of a device, such as a remote server or a user device, may be executed to cause the first avatar to be presented as an overlaid graphical representation during playback of the first segment of the video content. For example, an avatar rendering engine at a remote server may cause the first avatar to be presented as an overlaid graphical representation during playback of the first segment of the video content. Post-processing rules may include instructions regarding positioning of the overlay on a display, color configuration of the overlay graphic, and so forth. In some embodiments, different neural networks may be used for analyzing frames, generating avatars, and determining sign language motion data. In other embodiments, the same neural networks may be used for one or more of these tasks.

Figure 3:
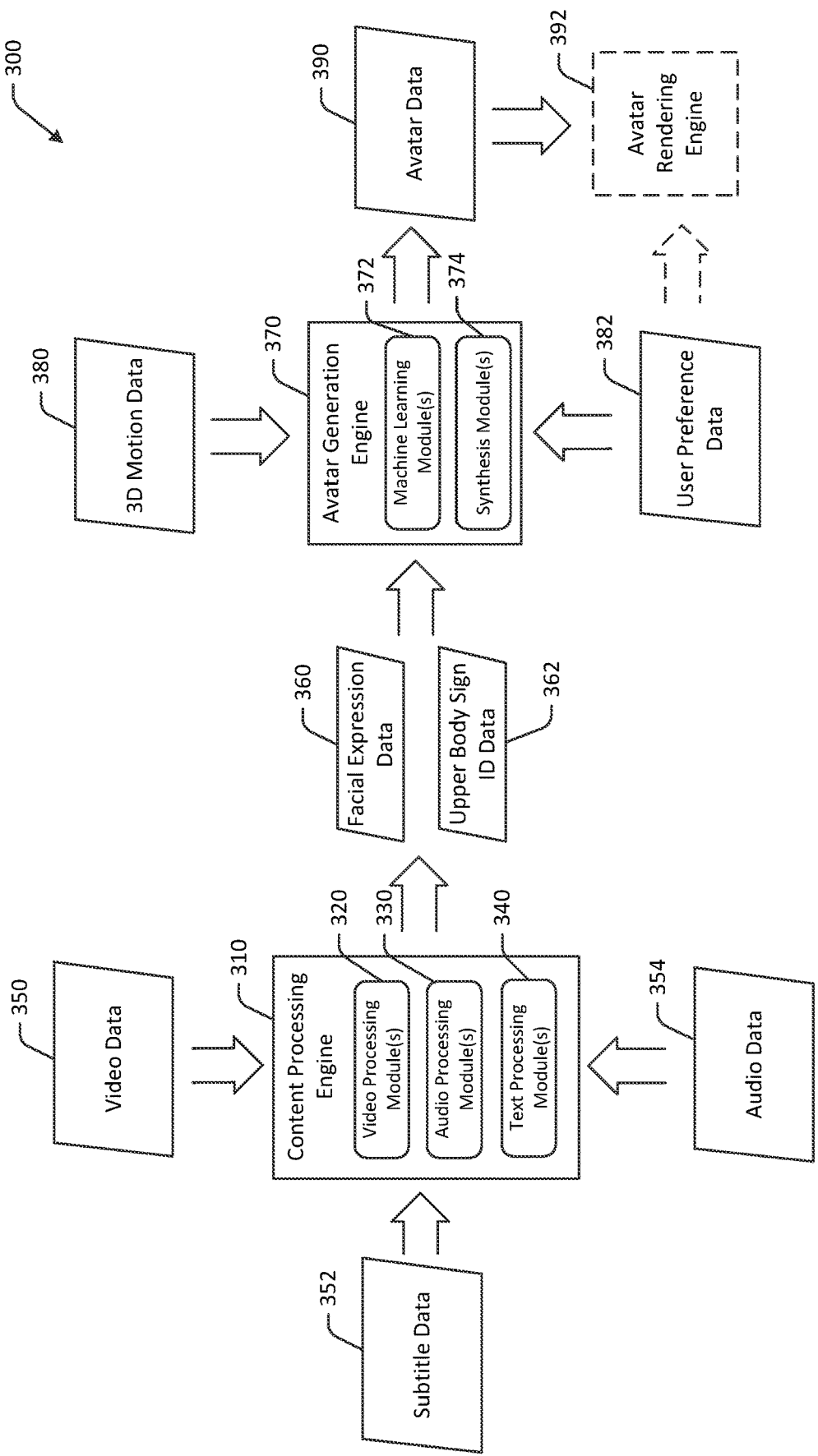
FIG. 3 is a schematic illustration of an example data and process flow for generating sign language avatars for video content in accordance with one or more example embodiments of the disclosure.

FIG. 3 is a schematic illustration of an example data and process flow for generating sign language avatars for video content in accordance with one or more example embodiments of the disclosure. Different embodiments may include different, additional, or fewer inputs or outputs than those illustrated in the example of FIG. 3.

In FIG. 3, an example data flow 300 is schematically depicted. A content processing engine 310 and/or one or more content processing module(s) may be configured to detect or determine one or more features present in digital content, such as audio, video, and/or text content. Features may include facial expression data, speaking actor identifiers, motion data for sign gestures that correspond to spoken dialogue, and so forth. The content processing engine 310 may be stored at and/or executed by one or more remote servers. The content processing engine 310 may include one or more modules or algorithms, and may be configured to identify or determine the presence of one or more features in digital content. The content processing engine 310 may be configured to output various data that can be used to generate an avatar that performs sign language gestures corresponding to dialogue in video content.

For example, the content processing engine 310 may include one or more video processing modules 320, one or more audio processing modules 330, and/or one or more text processing module(s) 340. Additional or fewer, or different, modules may be included. Any of the modules may incorporate one or more machine learning algorithms. The video processing module(s) 320 may be configured to process and/or analyze video content. For example, the video processing module(s) 320 may be configured to determine frames or sets of frames of video content and may be configured to detect certain features, such as speaking actors, facial expressions, as well as actions or events across multiple frames. For example, a video file for a movie may include a first frame, a second frame, and so forth. The video processing module(s) 320 may be configured to detect or analyze frames in video content to determine which frames correspond to the same scene. For example, the video processing module(s) 320 may include facial recognition and/or human pose detection algorithms that can be used to identify people or actions in certain locations over frames or segments of the video content, which may not always be consecutive. For example, a scene may be briefly interrupted by a flashback or cut to a different story, and may resume thereafter. Video processing module(s) 320 may include one or more object recognition algorithms configured to detect at least one of predefined objects, predefined scenery (e.g., certain locations, etc.), and the like.

The audio processing module(s) 330 may be configured to process and/or analyze audio content, such as audible dialogue, sound effects, music, and other audio. In some instances, the audio processing module(s) 330 may be configured to convert audio to text and/or perform natural language processing to determine a meaning of certain portions of audio or its corresponding transcription. The audio processing module(s) 330 may be configured to detect features such as sound effects (e.g., gunshots, explosions, etc.), music, dialogue (e.g., presence of certain words or phrases, etc.), and/or other sound-based features. Audio processing module(s) 330 may include one or more algorithms configured to detect at least one of dialogue, expressions, predefined sounds, and the like.

The text processing module(s) 340 may be configured to analyze and/or process text data, such as subtitles. The text processing module(s) 340 may include a first neural network configured to generate glosses of text data, such as meanings of words or dialogue spoken by actors in the video content.

The content processing engine 310 may receive one or more inputs for content for which an avatar performing sign gestures is to be generated. For example, the content processing engine 310 may receive one or more of video data 350 associated with content for which an avatar is to be generated, subtitle data 352 associated with the video content, and audio data 354 associated with content for which the avatar is to be generated. In some embodiments, the video data 350, subtitle data 352, and the audio data 354, may optionally be extracted from a content file.

The content processing engine 310 may process the respective data associated with the content for which a sign-language based avatar is to be generated. For example, the video data 350 may be processed using one or more of the video processing module(s) 320, the audio data 354 may be processed using one or more of the audio processing module(s) 330, and/or the subtitle data 352 may be processed using one or more of the text processing module(s) 340. Likewise, the subtitle data 352 and/or the optional text data may be processed using one or more of the modules or algorithms of the content processing engine 310.

Using one or more algorithms or modules, the content processing engine 310 may determine facial expressions and/or sentiment of dialogue in a video segment and may output facial expression data 360 and upper body sign language identifier data 362. For example, to generate the facial express data 360, the content processing engine 310 may determine, using a first machine learning model and based at least in part on the video data 350, a first facial expression of a first actor while speaking a first word, and may determine, using a second machine learning model and based at least in part on the audio data 354 and the first facial expression, a first set of facial expression parameters representing the facial expression corresponding to the first sentiment. The facial expression parameters may include one or more of mouth shape, eyebrow position, nose position, etc. For the upper body sign identifier data 362, the content processing engine 310 may process the subtitle data 352 to determine glosses for the dialogue. To determine a gloss, the content processing engine 310 may use the text processing module 340 to determine a first meaning of a first word, and may determine a first sign gesture associated with the first word by determining the first sign gesture associated with the first meaning of the first word.

The content processing engine 310 may be configured to classify sentiment of a portion of video content. For example, the content processing engine 310 may be configured to determine, using first audio and/or video content and a machine learning model, a sentiment classification associated with audible presentation of the first word and/or facial expressions during speaking of the first word. In some embodiments, the content processing engine 310 may determine, using the first set of frames and the sentiment classification, the first facial expression data 360.

The facial expression data 360 and the upper body sign language identifier data 362 may be input at an avatar generation engine 370 and/or one or more avatar generation module(s). The avatar generation engine 370 may be configured to generate avatars that present sign language for video segments using the facial expression data 360 and the upper body sign language identifier data 362. For example, the avatar generation engine 370 may generate motion data for avatars that, when presented or rendered, cause the avatar to perform sign language gestures that correspond to spoken dialogue and/or subtitle text, and also present facial features that convey emotion associated with the dialogue. The avatar generation engine 370 may implement one or more neural networks to generate avatars and/or corresponding motion.

For example, the avatar generation engine 370 may include one or more machine learning module(s) 372 and one or more synthesis module(s) 374. Other embodiments may have additional, fewer, and/or different modules. The avatar generation engine 370 may be configured to implement the machine learning module(s) 372 to determine gesture data that corresponds to certain sign language identifiers, as well as to determine whether to use sign language translation for a particular word, or to instead use a meaning or gloss associated with the word. The avatar generation engine 370 may use the synthesis module(s) 374 to stitch together a sequence of sign gestures to provide a fluid and/or seamless and smooth video of the avatar performing multiple gestures as the video content is presented and dialogue is ongoing.

The avatar generation engine 370 may receive one or more additional inputs, such as 3D motion data 380, representing a library of available motion data corresponding to different sign gestures. The avatar generation engine 370 may receive user preference data 382 that may be used to determine the appearance of an avatar, implement customized avatars, and so forth.

The avatar generation engine 370 may output avatar data 390, which may include data related to avatar appearance, avatar placement on a display, avatar motion sequences, and so forth. The avatar data 390 may be used to present sign language translations of dialogue appearing in video content, as performed by digital avatars. In some embodiments, the avatar data 390 may be input at an avatar rendering engine 392, which may be executed to cause rendering of the avatar during content playback. The user preference data 382 may be input at the avatar rendering engine 392 in some embodiments.

In some embodiments, the avatar generation engine 370 may be configured to parameterize the 3D motion data 380 to determine movements that a digital avatar is to perform relative to a human that may appear in the 3D motion data 380. For example, a first sign gesture may be presented by a human in a first video clip. The avatar generation engine 370 may be configured to determine, using the first video clip and a machine learning model, a parameterized model of the human performing the first sign gesture, and may determine, using the parameterized model, the first motion data to represent the first sign gesture.

The avatar generation engine 370 may be in communication with an optional avatar rendering engine 392. In some embodiments, the avatar rendering engine 392 may be a part of, or integrated with, the avatar generation engine 370. The avatar generation engine 370 may be configured to refine the first version of the avatar motion by using one or more post-processing rules, such as smoothing. The user preference data 382 may be used by the avatar generation engine 370 to determine custom lengths and/or formats of the avatar. The user preference data 382 may include information related to an active user profile or account, historical textual description settings (e.g., audible presentation selections, visual presentation selections, etc.), historically consumed content, historically viewed content and/or content summaries and resultant conversion information (e.g., whether the user viewed a content summary for content and then actually consumed the content, etc.), user content preference data, user content summary length preference data, and/or other preference data.

Figure 4A:
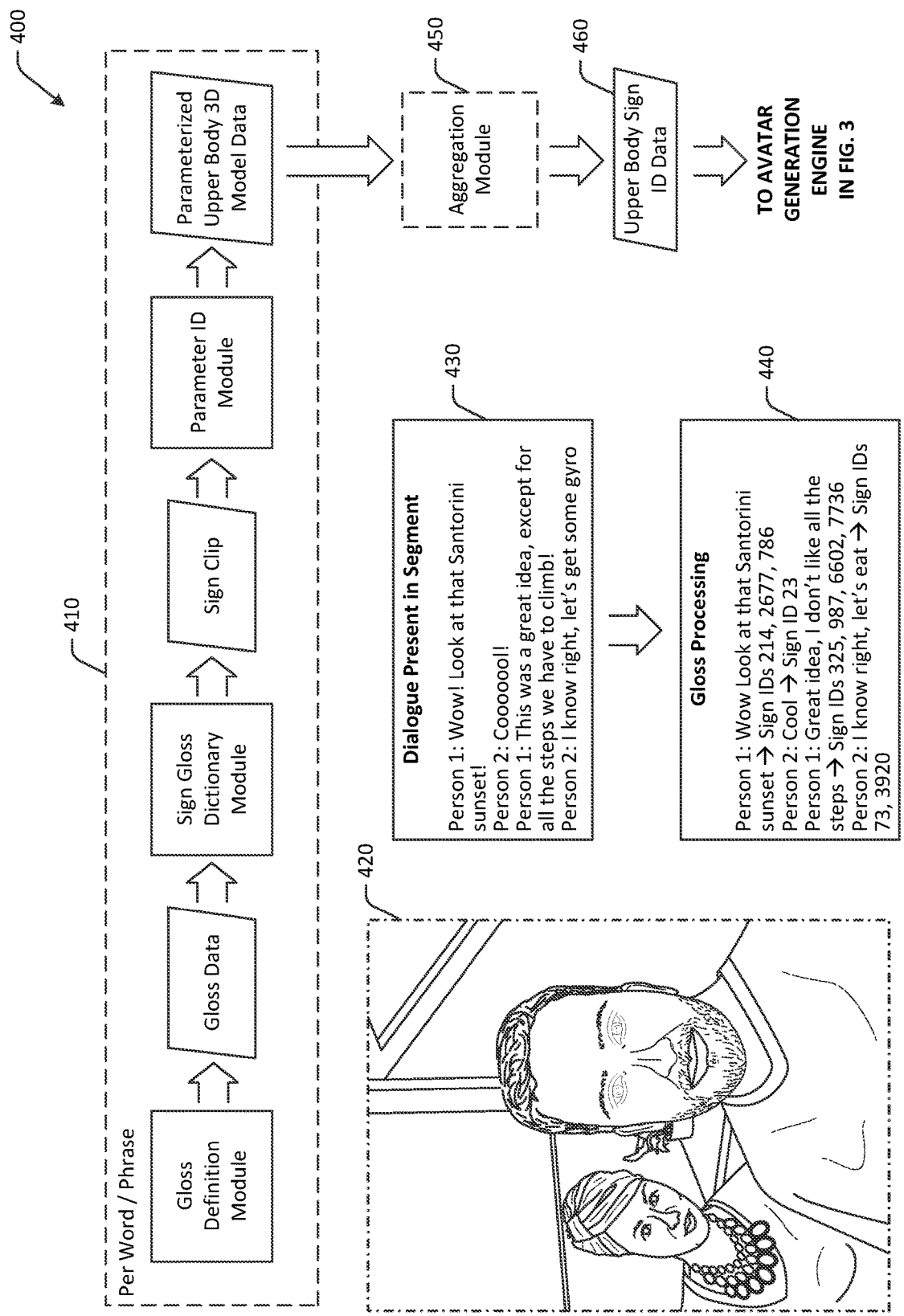
FIGS. 4A-4B are schematic illustrations of example sign language avatar generation processing models in accordance with one or more example embodiments of the disclosure.
Figure 4B:
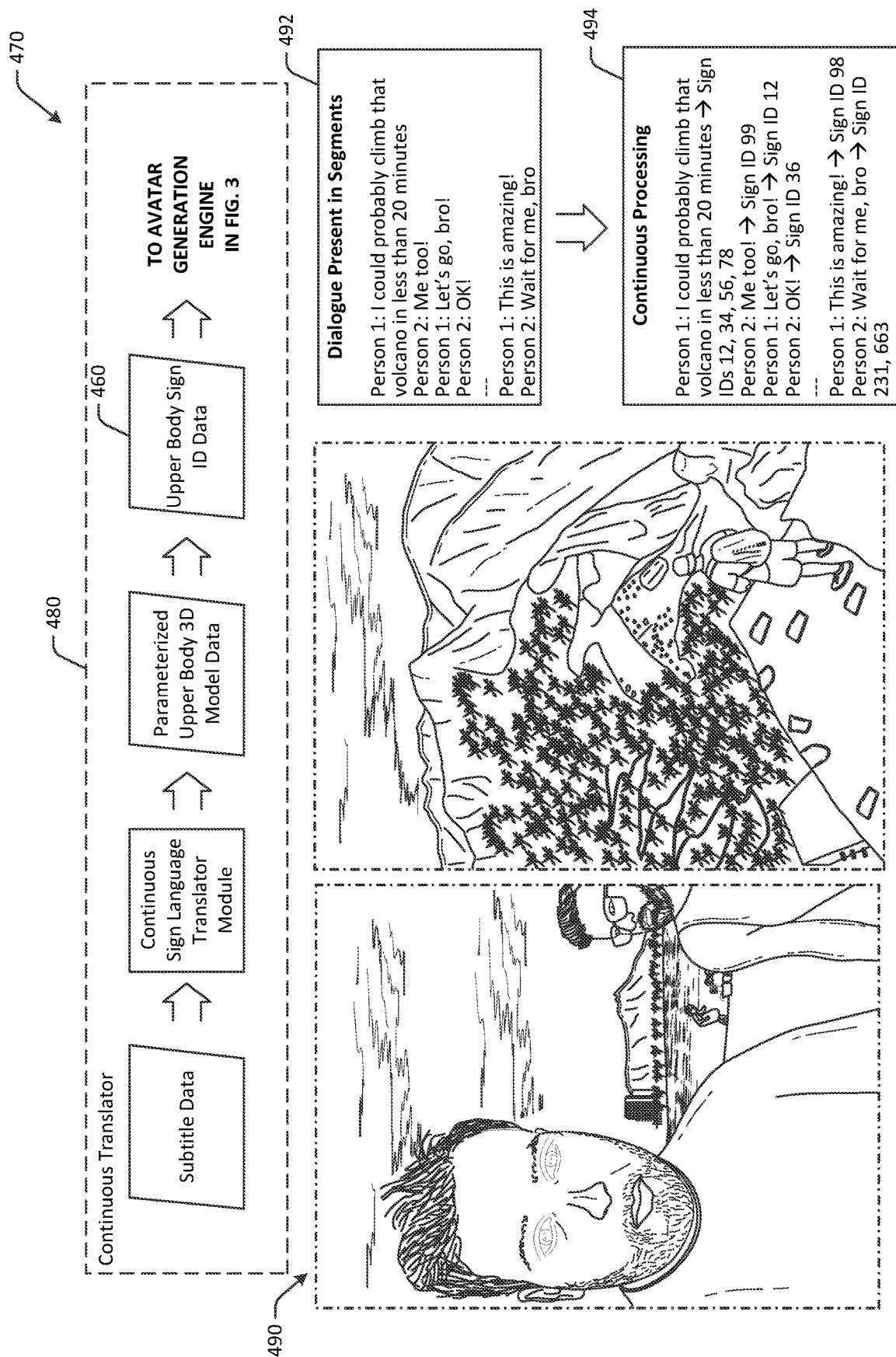

FIGS. 4A-4B are schematic illustrations of example sign language avatar generation processing models in accordance with one or more example embodiments of the disclosure. Other embodiments may include additional or fewer operations than those depicted in the example of FIGS. 4A-4B. The processes described with respect to FIGS. 4A-4B may be implemented using the systems described herein.

In FIG. 4A, a continuous sign language performing avatar 400 can be generated using machine learning. The model may be based on natural language processing and may output a continuous sign language animated video clip given input video with different modalities of signals (e.g., visual frames, audio, text, etc.). The embodiment of FIG. 4A may be a dictionary-based sign language avatar generator, and may use a pre-populated dictionary of words with associated sign language clips. In contrast, in FIG. 4B, a continuous sign language avatar generator may be configured to directly translate an utterance to a sign clip without any prior dictionary requirement.

In FIG. 4A, a remote server may implement a process flow 410, where, for some or all words or phrases appearing in subtitle or text data, a gloss definition module at a remote server may be executed to output gloss data for the word. The gloss data may provide a meaning or slightly broader term associated with the word. The remote server may implement a sign gloss dictionary module which may access a database that stores sign language identifiers in association with glosses or words. The remote server may determine a sign clip that corresponds to the gloss or word, where the sign clip may be raw or processed video of a human performing a sign gesture. The remote server may implement a parameter identification module to parameterize the motion of the sign gesture performed in the human video clip. The remote server may determine, using the parameter identification module, parameterized upper body 3D model data. The parameterized upper body 3D model data may be input at an optional aggregation module 450, which may output upper body sign data 460. The upper body sign data 460 may be input at an avatar generation engine, such as the avatar generation engine 370 in FIG. 3. The aggregation module 450 may aggregate the sign gesture data, or more specifically, the parameterized upper body 3D model data, over a sequence of words or phrases.

In the example of FIG. 4A, video content 420 may include dialogue present in the segment 430, where gloss processing results in a gloss 440 of the dialogue. The gloss process may cause the overall dialogue to be reduced in length and may be easier to translate to sign language (e.g., "let's eat" instead of "let's get some gyro," etc.).

In FIG. 4B, a continuous sign language avatar generator 470 may be configured to directly translate an utterance to a sign clip without any prior dictionary requirement. Instead of the individual word process of FIG. 4A, a continuous translation process 480 may be executed at a remote server, where subtitle data associated with the video content is input at a continuous sign language translator module. The continuous sign language translator module outputs parameterized upper body 3D model data for words that appear in the subtitle data, where the parameterized upper body 3D model data is converted to upper body sign data 460. The upper body sign data 460 may be input at an avatar generation engine, such as the avatar generation engine 370 in FIG. 3.

In contrast to FIG. 4A, the process in FIG. 4B may provide a direct translation of words that appear in the dialogue 492 of a video segment 490, where the continuous processing yields sign identifiers 494 associated with the words that appear, instead of glosses and/or further processing of the textual data. The continuous model in FIG. 4B may be difficult to improve and/or optimize due to the nature of the training data sets needed to improve performance, as there is no glossing and related flexibility in determining the most accurate sign gesture to choose for performance.

Figure 5:
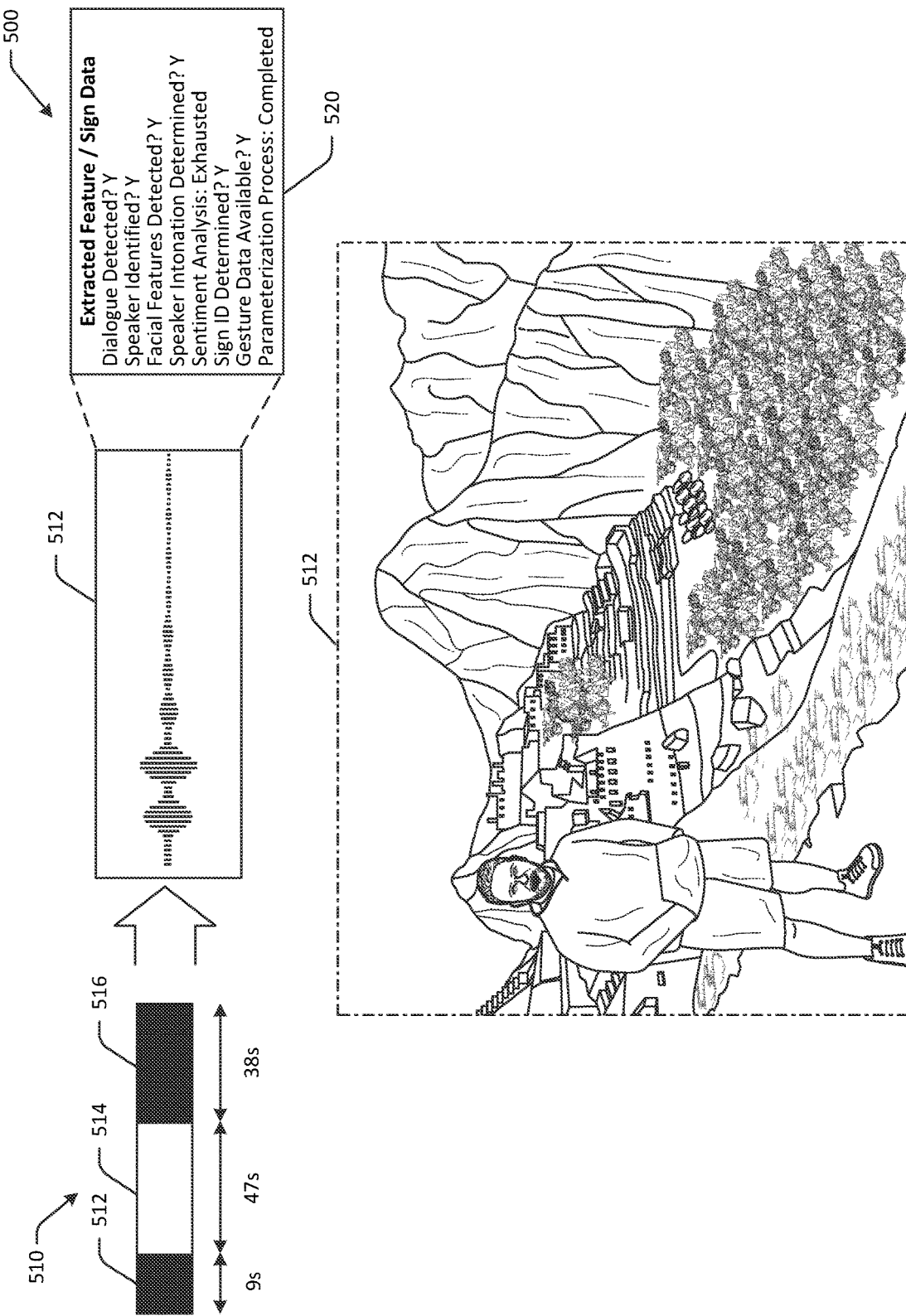
FIG. 5 is a schematic illustration of example extracted feature detection in accordance with one or more example embodiments of the disclosure.

FIG. 5 is a schematic illustration of example extracted feature detection 500 in accordance with one or more example embodiments of the disclosure. While example embodiments of the disclosure may be described in the context of frames or images, it should be appreciated that the disclosure is more broadly applicable to any suitable portion of digital content.

In FIG. 5, video content 510 may be processed to determine or extract various features, such as facial expression data, tone data (e.g., tone of voice, etc.), volume data, sentiment data, and so forth. For example, the content 510 may include a first segment 512 having a length of 9 seconds, a second segment 514 having a length of 47 seconds, and a third segment 516 having a length of 38 seconds. The first segment 512 may be separated from the third segment 516 by a second segment 514 having a length of 47 seconds. The first segment 512 may therefore be associated with a first start timestamp of 0:00 and a first end timestamp of 0:09, and the third segment may have a start timestamp of 0:56 and an end timestamp of 1:34. The second segment 514 may be associated with a start timestamp of 0:09 and an end timestamp of 0:56. Timestamps may be determined for segments and/or events that occur in the content 510. For example, a first timestamp may be associated with a start of the first event, and a second timestamp may be associated with the end of the first event. An example frame of the first segment 512 is depicted in the example of FIG. 5 and may include a hiking scene where the speaking actor is exhausted.

The remote server may process the respective frames and audio content of the segments using various image processing algorithms and/or audio processing algorithms. For example, for the first segment 512, the remote server may process the corresponding audio to determine dialogue present in the segment 512. The output of the audio analysis may include detected dialogue, sounds, such as music, street noise, background chatter, and so forth. For example, extracted feature/sign data 520 for the first segment 512 may include various features including whether dialogue was detected, which actor spoke the dialogue, whether facial features of the speaking actor were detected, what the sentiment of the speaking actor was during speaking (e.g., exhausted in the example of FIG. 5), whether a corresponding sign identifier was found or determined for the dialogue, whether gesture data corresponding to the sign identifier is available, whether a parameterization of the gesture data has been completed, what a tone of voice or intonation of a speaker was, and so forth.

Audio detection may be used to determine dialog that occurs in a segment, actions or events that may occur during the segment, the tempo or pace of the segment, and/or the like. For example, a remote server or a user device may be used to analyze one or more portions of audio of a content file to determine whether instances of any predefined sounds, verbs, keywords, or other features are present.

Dialogue may be determined to be present based at least in part on audio detection, voice processing, or other audio, text, image, or video processing algorithms. In some embodiments, individual portions of audio data may be analyzed to determine whether any dialogue is present. The audio processing algorithm may be configured to detect dialogue, predefined sounds, and other audio-based features present in the audio. Audio processing may also be used to determine the occurrence of events, and/or to corroborate the occurrence of events. For example, cheering may be associated with a winning home run or basketball goal. In some embodiments, a remote server may determine, using one or more audio processing algorithms, an event that occurs in audio content, and may determine a theme of the corresponding scene or segment using the event.

In some embodiments, a remote server may determine a movie file that includes video data, audio data, and subtitle data, where the subtitle data has a first word and a second word. The remote server may determine, using a first machine learning model, a first meaning of the first word, and may determine, using the first machine learning model, a first sign language equivalent of the first meaning, where the first sign language equivalent is represented by a human performing a first sign gesture in a first video clip. The remote server may determine, using the first machine learning model, a first parameterized three-dimensional model of the human performing the first sign gesture in the first video clip, and may determine, using the first machine learning model, a first set of upper body parameters to represent the first sign language equivalent of the first meaning using the first parameterized 3D model.

The remote server may optional extract a first video segment from the video data, the first video segment having a first frame and a second frame that corresponds to a time window associated with the first word, and may determine, using a second machine learning model and based at least in part on the first frame and the second frame, that a first actor is a speaker of the first word, where the first actor is associated with a first actor identifier. The remote server may extract a first audio segment from the audio data that corresponds to the first video segment. The remote server may determine, using a third machine learning model and based at least in part on the first audio segment, a first sentiment associated with the first actor speaking the first word, and may select a first avatar based at least in part on the first actor identifier. The remote server may generate a first animated video clip using the first set of upper body parameters and the first sentiment, where the first animated video clip has the first avatar performing the first sign gesture while presenting a facial expression corresponding to the first sentiment. The remote server may cause presentation of the first animated video clip as an overlaid graphical representation during playback of the movie file or other video content.

Figure 6:
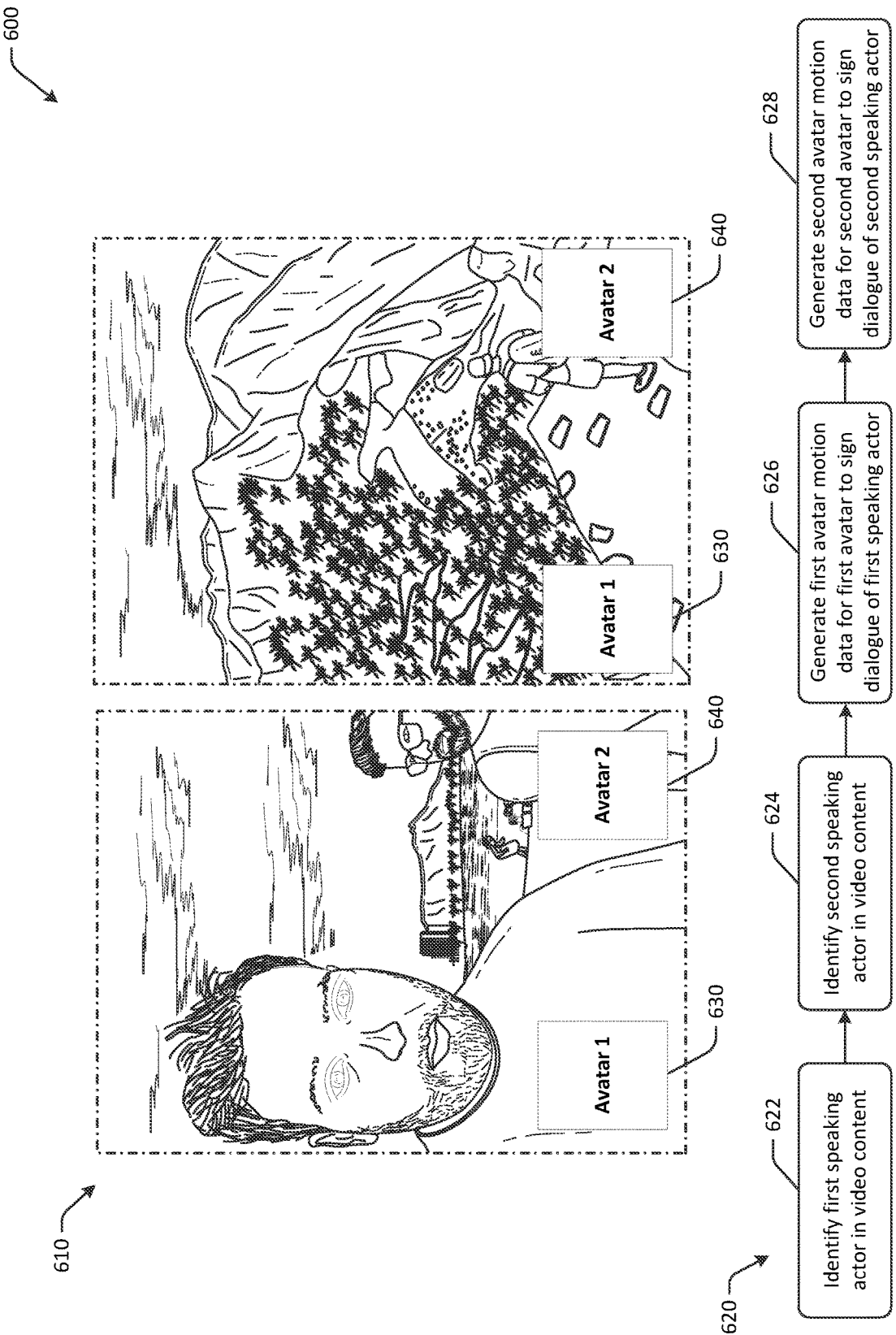
FIG. 6 is a schematic illustration of an example use case and process flow for generation of multiple sign language avatars for video content in accordance with one or more example embodiments of the disclosure.

FIG. 6 depicts an example use case 600 and process flow 620 for generation of multiple sign language avatars for video content in accordance with one or more example embodiments of the disclosure. Other embodiments may include additional or fewer operations than those depicted in the example of FIG. 6. The process described with respect to FIG. 6 may be implemented using the systems described herein.

In some embodiments, different avatars may be used to represent different actors that speak dialogue. In some instances, such as instances where two actors are engaged in back-and-forth dialogue in a video scene, more than one avatar may also be presented. One avatar may present sign gestures corresponding to the dialogue of a first actor, and another avatar may present sign gestures corresponding to the dialogue of a second actor. The avatars may be the same or different. In some embodiments, the appearance of the avatar may be similar to the actor that is speaking the dialogue. For example, a male actor may be represented (optionally) by an avatar having a male appearance, and so forth.

In the example of FIG. 6, video content 610 may include a number of frames that include two actors engaging in dialog. For example, a first actor may say "let's go climb that volcano," and the second actor may say "let's go, bro." The dialogue may span across a video segment with several video frames. The dialogue may be reflected in subtitle data associated with the segment of video.

A first avatar (labeled Avatar 1 in FIG. 6) may be used to present sign language gestures corresponding to the dialogue spoken by the first actor, and a second avatar (labeled Avatar 2 in FIG. 6) may be used to present sign language gestures corresponding to the dialogue spoken by the second actor. The facial expressions presented by the respective avatars may be determined based at least in part on the sentiment and/or facial expressions presented by the actor speaking the dialogue. The two separate avatar overlays may persist during the video segment, and when the back-and-forth dialogue between the two actors is completed, a single avatar overlay may be presented as appropriate. For example, the first avatar may 630 be presented in a first video frame, and may also be presented in a second video frame as well, and the second avatar 640 may also be presented in the first video frame and the second video frame.

Accordingly, in some embodiments, a remoter server may identify or otherwise determine, using a set of frames, an actor that speaks a first word. The remote server may select an avatar to present sign language gestures corresponding to the first word based at least in part on an actor identifier associated with the actor. In some embodiments, certain actors may be associated with specific avatars, whereas in other embodiments, the same avatar may be used to present the dialogue of more than one actor.

In some embodiments, the remote server may determine a sign gesture associated with a word, and may determine motion data associated with the sign gesture. The remote server may determine, using a set of frames, facial expression data, and may generate an avatar configured to perform the sign gesture using the motion data, where a facial expression of the avatar while performing the sign gesture is based at least in part on the first facial expression data. The remote server may cause more than one avatar, such as the first avatar and the second avatar, to be presented at least partially concurrently as overlaid graphical representations during playback of the first segment of the video content, as depicted in the example of FIG. 6.

In some embodiments, the remote server may optionally generate a first animated video clip that includes a first avatar performing a first sign gesture corresponding to the first word, and a second animated video clip that includes a second sign gesture corresponding to a second word. The remote server may also optionally generate a video file that includes the first animated video clip and the second animated video clip stitched together. Video effects, such as smoothing and the like, may be applied to synchronize sign gesture movements.

To present multiple avatars during dialogue between multiple onscreen actors, a remote server may execute the example process flow 620. For example, the remote server and/or computer system may include at least one memory that stores computer-executable instructions and at least one processor configured to access the at least one memory and execute the computer-executable instructions to perform various actions or operations, such as one or more of the operations in the process flow 620.

At block 622, the remote server may identify a first speaking actor in video content. For example, the remote server may determine, using one or more machine learning models and based at least in part on one or more video frames, that a first actor is a speaker of a first word of dialogue. The first actor may be identified based at least in part on movement of the actor's mouth relative to movement of other actor's mouths that appear in the frames. In some embodiments, the actor may be identified based at least in part on subtitle data that may identify the speaking actor. The actor may be associated with an actor identifier.

At block 624, the remote server may identify a second speaking actor in the video content. For example, the remote server may determine, using one or more machine learning models and based at least in part on one or more video frames, that a second actor is a speaker of a second word of dialogue. The second actor may be identified based at least in part on movement of the actor's mouth relative to movement of other actor's mouths that appear in the frames. In some embodiments, the actor may be identified based at least in part on subtitle data that may identify the speaking actor. The actor may be associated with an actor identifier.

At block 626, the remote server may generate first avatar motion data for a first avatar to sign dialogue of the first speaking actor. For example, the remote server may select a first avatar based at least in part on a first actor identifier. The remote server may determine sign language motion corresponding to the dialogue spoken by the first actor, and may cause a digital avatar to present the dialogue in sign language using the motion data.

At block 628, the remote server may generate second avatar motion data for a second actor to sign dialogue of the second speaking actor. For example, the remote server may select a second avatar based at least in part on a second actor identifier. The remote server may determine sign language motion corresponding to the dialogue spoken by the second actor, and may cause a digital avatar to present the dialogue in sign language using the motion data.

In some embodiments, the remote server may generate animated clips of the respective avatars performing sign gestures. For example, the remote server may generate a first animated video clip for the first avatar, and a second animated video clip including the second avatar performing a second sign gesture corresponding to the second word. The remote server may cause presentation of the second animated video clip as an overlaid graphical representation during playback of the movie file, where the first animated video clip and the second animated video clip are presented at least partially concurrently.

Figure 7:
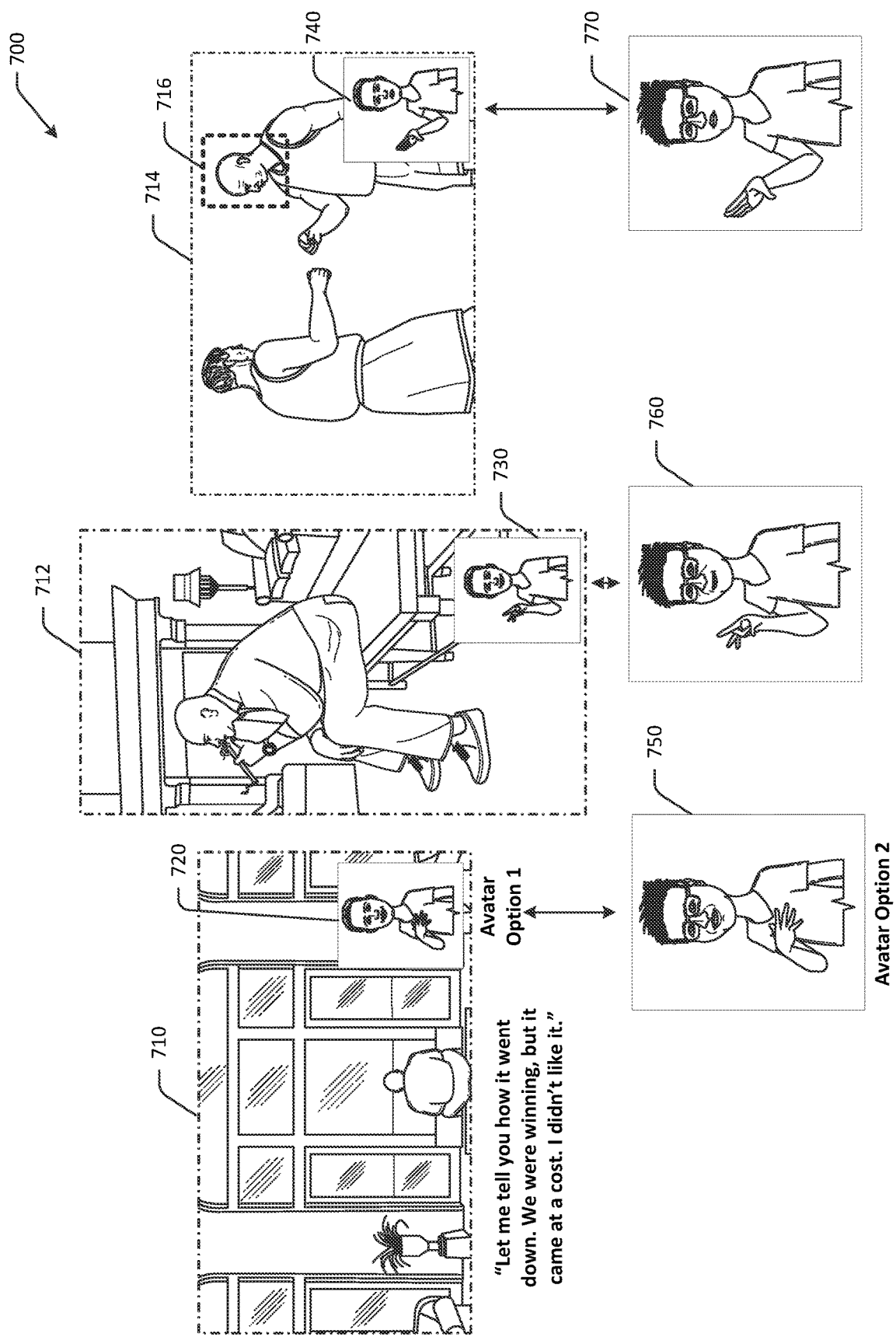
FIG. 7 is a schematic illustration of an example use case for generation of customized sign language avatars for video content in accordance with one or more example embodiments of the disclosure.

FIG. 7 is a schematic illustration of an example use case 700 for generation of customized sign language avatars for video content in accordance with one or more example embodiments of the disclosure. Other embodiments may include additional or fewer operations than those depicted in the example of FIG. 7. The process described with respect to FIG. 7 may be implemented using the systems described herein.

In some embodiments, customized avatars may be configured by users and used to present sign language translations of dialogue. For example, a user may configure an avatar to have a certain appearance (e.g., facial features, skin tone, hairstyle, etc.), and the customized avatar may be used to present sign language to the user during playback of video content.

In the example of FIG. 7, a user may be consuming video content including a first video frame 710, a second video frame 712, and a third video frame 714. The video content may include corresponding audio represented as subtitle text of "let me tell you how it went down. We were winning, but it came at a cost. I didn't like it."

A default avatar used to present the sign language representation of the portion of the subtitle data corresponding to "I didn't like it" may have a first appearance and may be rendered as a first avatar option. In the first video frame 710, the first avatar option may be presented 720 as an overlay and may perform a sign gesture corresponding to a first portion of "I didn't like it." In the second video frame 712, the first avatar option may be presented 730 as an overlay and may perform a sign gesture corresponding to a second portion of "I didn't like it." In the third video frame 714, the first avatar option may be presented 740 as an overlay and may perform a sign gesture corresponding to a third portion of "I didn't like it." The first avatar option may represent facial expressions based at least in part on the sentiment of the actor speaking the words "I didn't like it." The sentiment may be determined based at least in part on analysis of the facial expressions, tone, volume, and/or other features of the audio and video frames corresponding to the actor presenting the dialogue. In the example of FIG. 7, the sentiment may be competitive and/or ambitious.

If the user desires to use a custom designed avatar and/or a different avatar option, the user can cause the first avatar option to be replaced with a second avatar option. The second avatar option may have an avatar with different aesthetic features and/or appearance, but may still perform the same gestures as the first avatar option, and may also perform or exhibit the same facial expressions. For example, the second avatar option may be presented 750 as an overlay in the first video frame 710, and may perform a sign gesture corresponding to a first portion of "I didn't like it." In the second video frame 712, the second avatar option may be presented 760 as an overlay and may perform a sign gesture corresponding to a second portion of "I didn't like it." In the third video frame 714, the second avatar option may be presented 770 as an overlay and may perform a sign gesture corresponding to a third portion of "I didn't like it."

In this manner, the user may enjoy a customized avatar experience with an avatar the user may customize and/or select from one or more pre-configured avatars. In some instances, a user may assign different avatars to different actors that appear in the video content, such that different avatars are presented to sign the dialogue of different actors that speak. Such features may assist users in understanding which user 716 is presenting certain dialogue, and may also allow users to configure avatars that allow the user to easily view sign language gestures corresponding to the dialogue.

Figure 8:
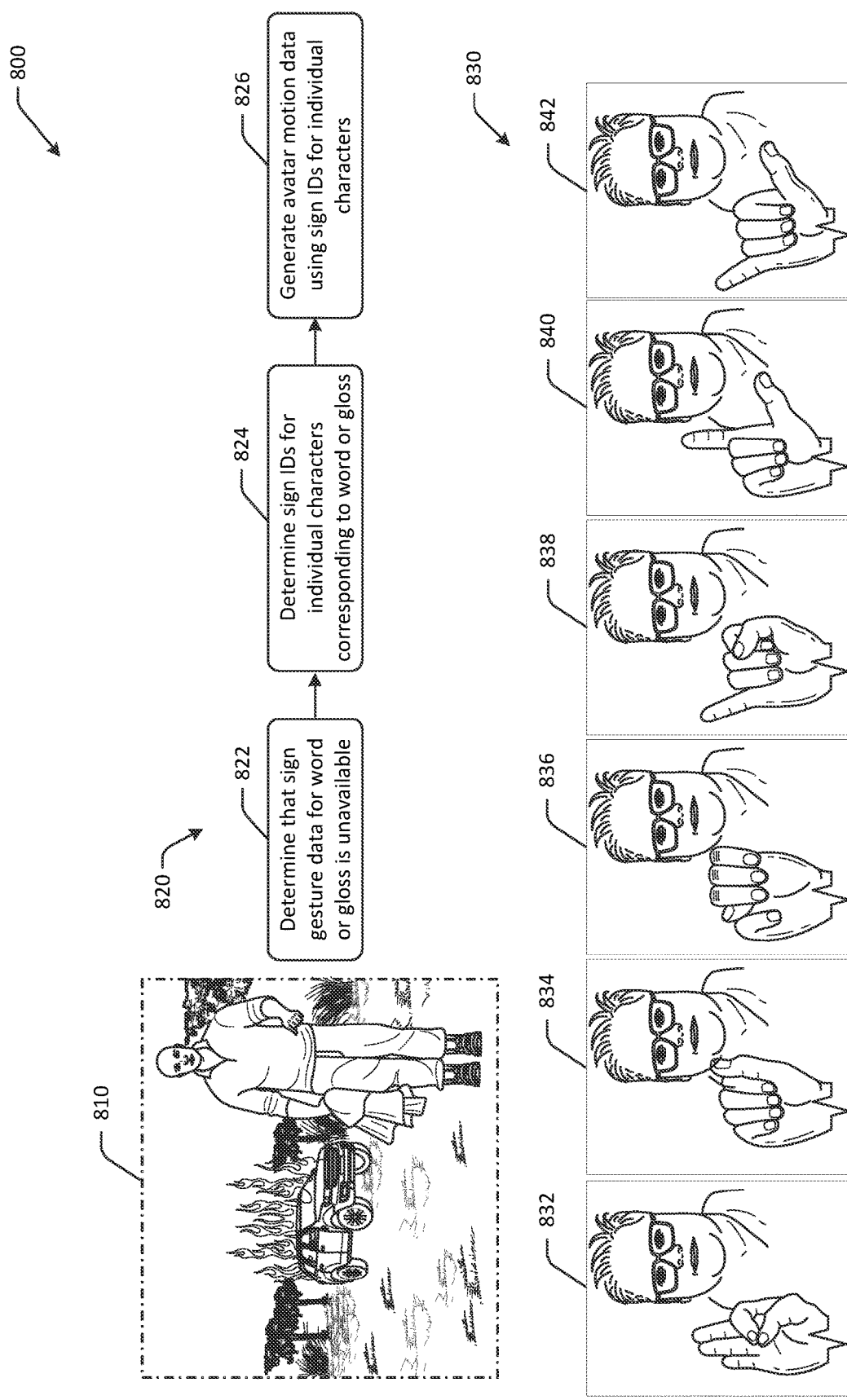
FIG. 8 is a schematic illustration of an example use case and process flow for sign language motion data exception handling in accordance with one or more example embodiments of the disclosure.

FIG. 8 is a schematic illustration of an example use case 800 and process flow 820 for sign language motion data exception handling in accordance with one or more example embodiments of the disclosure. Other embodiments may include additional or fewer operations than those depicted in the example of FIG. 8. The process described with respect to FIG. 8 may be implemented using the systems described herein.

In the example of FIG. 8, video content 810 may include a frame and/or video segment with corresponding dialogue that includes words for which a sign language equivalent is unavailable. For example, depending on the type of sign language a user desires to view and/or the particular word or phrase for which a sign language translation is desired, the sign language equivalent may be unavailable in a sign language motion data library or directory. Accordingly, an exception may occur for translation of the particular word or phrase into sign language motion to be performed by a digital avatar.

In such instances, embodiments may perform sign language characters of the individual characters that form the word or phrase using the digital avatar. For example, instead of performing the sign gesture for the phrase "go Braves," the individual characters (e.g., G-O-B-R-A-V-E-S) may be performed using corresponding hand motions.

To determine whether to handle a particular word or phrase as an exception, the process flow 820 may be executed by one or more computer systems, such as by an avatar generation engine executed at one or more remote servers. For example, the remote server and/or computer system may include at least one memory that stores computer-executable instructions and at least one processor configured to access the at least one memory and execute the computer-executable instructions to perform various actions or operations, such as one or more of the operations in the process flow 820.

At block 822, it may be determined that sign gesture data for a word or gloss is unavailable. For example, one or more avatar generation modules at a remote server may be executed to determine that sign gesture data for a word or gloss is unavailable. The sign gesture data may be unavailable in a directory or library accessed by the computer system. If it is determined that sign gesture data is unavailable, the process flow may proceed to block 824.

At block 824, sign identifiers for individual characters corresponding to the word/phrase (or a gloss corresponding to the word/phrase) may be determined. For example, individual sign characters for G-O-B-R-A-V-E-S may be determined. The associated sign gesture or sign language motion data for the individual characters may be determined. The gesture or data may be in parameterized format or may be in another format.

At block 826, avatar motion data may be generated using the sign identifiers for the individual characters. Gesture data for the hand gestures used to form the individual characters may be determined and may be used for the avatar motion data. The avatar may then be rendered performing the letters or characters that form the word or phrase (or corresponding gloss). As a result, the user may still be presented with the sign language conversion of the dialogue.

In the example of FIG. 8, the video content 810 may have corresponding subtitle data of "you do it for family." Accordingly, the server may determine that the sign gesture data for the word "family" is unavailable, and instead may determine the individual character sign gesture data, which may then be used to determine avatar movement.

For example, the avatar may perform a sequence as part of an animated clip 830 that includes performing a first gesture 832 for "F," a second gesture 834 for "A," a third gesture 836 for "M," a fourth gesture 838 for "I," a fifth gesture 840 for "L," and a sixth gesture 842 for "Y." Accordingly, although sign gesture data for the word "family" may have been unavailable, a user can still read the individual characters forming the word "family," and understand the dialog. Moreover, the facial expression(s) presented by the avatar can convey additional context regarding the tone and emotion associated with the manner in which the word "family" is spoken in the video content 810.

In some embodiments, a remote server may determine, using a first machine learning model for instance (e.g., a sign gesture selection model, etc.), that a sign gesture associated with a particular word or phrase appearing in dialogue of video content (or corresponding gloss) is unavailable. The remote server may determine individual sign gestures corresponding to characters that form the word or its meaning, and may generate an avatar configured to perform the individual sign gestures.

In some embodiments, text or subtitles of video content may be converted to glosses that represent a meaning of a word. For example, the phrase "fam" may be converted to "family" as a gloss. In some embodiments, the remote server may use a machine learning model to determine a meaning of a word, and may determine, using the same or a different machine learning model, that a sign language equivalent of the meaning is unavailable. The remote server may determine individual sign gestures corresponding to characters that form the meaning, and may generate an animated video clip with the avatar performing the individual sign gestures.

One or more operations of the methods, process flows, or use cases of FIGS. 1-8 may have been described above as being performed by a user device, or more specifically, by one or more program module(s), applications, or the like executing on a device. It should be appreciated, however, that any of the operations of the methods, process flows, or use cases of FIGS. 1-8 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-8 may be described in the context of the illustrative devices, it should be appreciated that such operations may be implemented in connection with numerous other device configurations.

The operations described and depicted in the illustrative methods, process flows, and use cases of FIGS. 1-8 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 9:
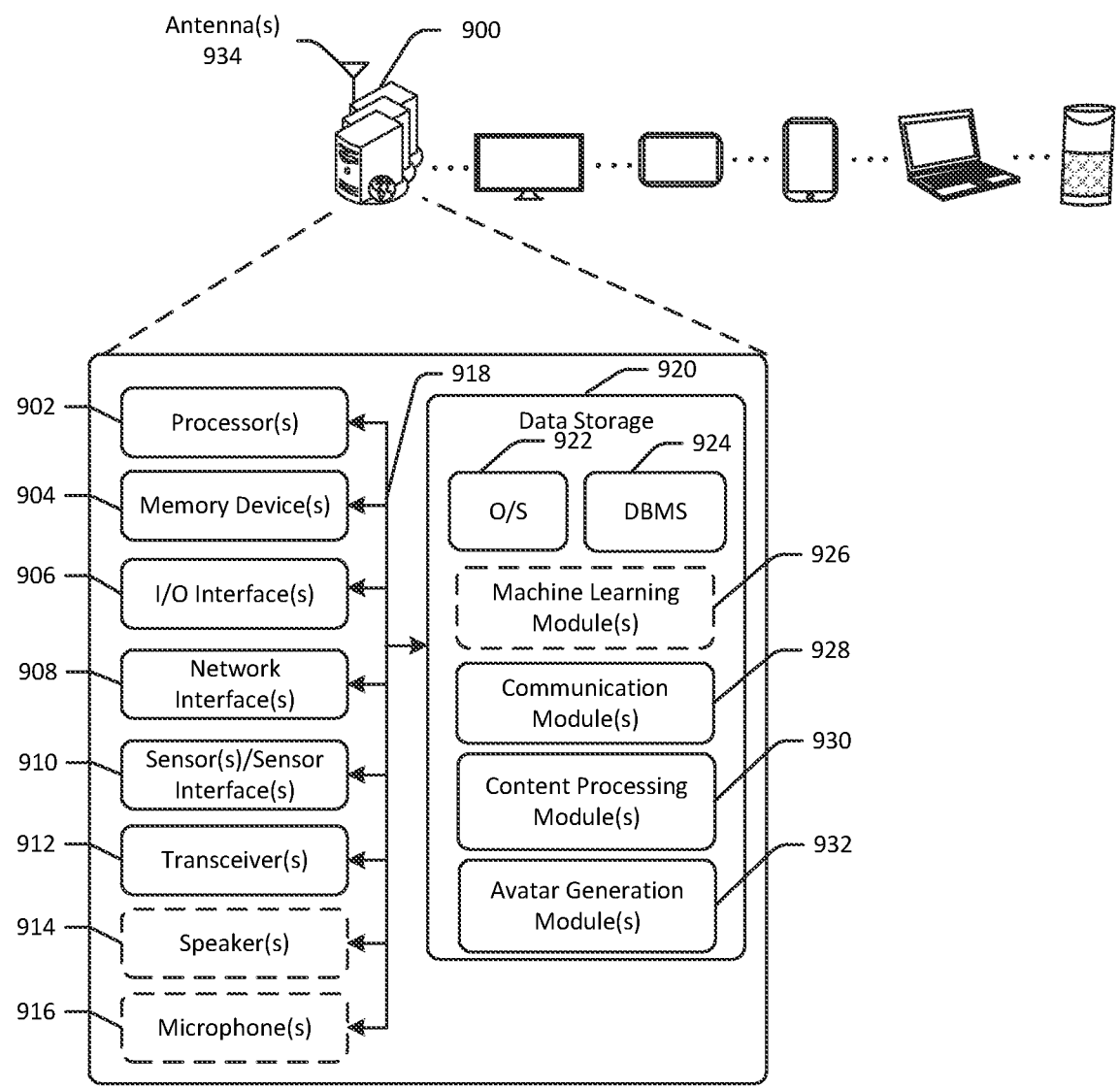
FIG. 9 is a schematic block diagram of an illustrative device in accordance with one or more example embodiments of the disclosure.

FIG. 9 is a schematic block diagram of an illustrative remote server 900 in accordance with one or more example embodiments of the disclosure. The remote server 900 may include any suitable computing device capable of receiving and/or sending data including, but not limited to, a mobile device such as a smartphone, tablet, e-reader, wearable device, or the like; a desktop computer; a laptop computer; a content streaming device; a set-top box; or the like. The remote server 900 may correspond to an illustrative device configuration for the devices of FIGS. 1-8.

The remote server 900 may be configured to communicate via one or more networks with one or more servers, search engines, user devices, or the like. In some embodiments, a single remote server or single group of remote servers may be configured to perform more than one type of sign language avatar generation, presentation, rendering, and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 900 may include one or more processors (processor(s)) 902, one or more memory devices 904 (generically referred to herein as memory 904), one or more input/output (I/O) interface(s) 906, one or more network interface(s) 908, one or more sensors or sensor interface(s) 910, one or more transceivers 912, one or more optional speakers 914, one or more optional microphones 916, and data storage 920. The remote server 900 may further include one or more buses 918 that functionally couple various components of the remote server 900. The remote server 900 may further include one or more antenna(s) 934 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 918 may include at least one of a system bus, a memory bus, an address bus, or a message bus, and may permit exchange of information (e.g., data (including computer-executable code), signaling, etc.) between various components of the remote server 900. The bus(es) 918 may include, without limitation, a memory bus or a memory controller, a peripheral bus, an accelerated graphics port, and so forth. The bus(es) 918 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 904 of the remote server 900 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 904 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 920 may include removable storage and/or non-removable storage including, but not limited to, magnetic storage, optical disk storage, and/or tape storage. The data storage 920 may provide non-volatile storage of computer-executable instructions and other data. The memory 904 and the data storage 920, removable and/or non-removable, are examples of computer-readable storage media (CRSM) as that term is used herein.

The data storage 920 may store computer-executable code, instructions, or the like that may be loadable into the memory 904 and executable by the processor(s) 902 to cause the processor(s) 902 to perform or initiate various operations. The data storage 920 may additionally store data that may be copied to memory 904 for use by the processor(s) 902 during the execution of the computer-executable instructions. Moreover, output data generated as a result of execution of the computer-executable instructions by the processor(s) 902 may be stored initially in memory 904, and may ultimately be copied to data storage 920 for non-volatile storage.

More specifically, the data storage 920 may store one or more operating systems (O/S) 922; one or more database management systems (DBMS) 924; and one or more program module(s), applications, engines, computer-executable code, scripts, or the like such as, for example, one or more optional machine learning module(s) 926, one or more communication module(s) 928, one or more content processing module(s) 930, and/or one or more avatar generation module(s) 932. Some or all of these module(s) may be sub-module(s). Any of the components depicted as being stored in data storage 920 may include any combination of software, firmware, and/or hardware. The software and/or firmware may include computer-executable code, instructions, or the like that may be loaded into the memory 904 for execution by one or more of the processor(s) 902. Any of the components depicted as being stored in data storage 920 may support functionality described in reference to correspondingly named components earlier in this disclosure.

The data storage 920 may further store various types of data utilized by components of the remote server 900. Any data stored in the data storage 920 may be loaded into the memory 904 for use by the processor(s) 902 in executing computer-executable code. In addition, any data depicted as being stored in the data storage 920 may potentially be stored in one or more datastore(s) and may be accessed via the DBMS 924 and loaded in the memory 904 for use by the processor(s) 902 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 9, the datastore(s) may include, for example, avatar preference information, user action information, historical content consumption information, and other information.

The processor(s) 902 may be configured to access the memory 904 and execute computer-executable instructions loaded therein. For example, the processor(s) 902 may be configured to execute computer-executable instructions of the various program module(s), applications, engines, or the like of the remote server 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to functionality supported by the various program module(s) depicted in FIG. 9, the optional machine learning module(s) 926 may include computer-executable instructions, code, or the like that responsive to execution by one or more of the processor(s) 902 may perform functions including, but not limited to, determining textual description data, determining avatar motion, determining or detecting actions and/or events, generating one or more machine learning models or algorithms, determining or classifying words or text, determining frames of content, generating parameterized models, determining sign language motion data, and the like.

The communication module(s) 928 may include computer-executable instructions, code, or the like that responsive to execution by one or more of the processor(s) 902 may perform functions including, but not limited to, communicating with one or more devices, for example, via wired or wireless communication, communicating with remote servers, communicating with remote datastores, sending or receiving notifications or commands/directives, communicating with cache memory data, communicating with user devices, and the like.

The content processing module(s) 930 may include computer-executable instructions, code, or the like that are responsive to execution by one or more of the processor(s) 902 may perform functions including, but not limited to, analyzing digital content, extracting frames, determining pixel color values, determining audio content, determining or analyzing audio files, identifying certain portions of content, extracting segments of content, determining facial expressions and/or related data, and the like.

The avatar generation module(s) 932 may include computer-executable instructions, code, or the like that responsive to execution by one or more of the processor(s) 902 may perform functions including, but not limited to, determining sign language motion data, rendering avatars, stitching and/or smoothing video clips or animated avatar clips, combining textual descriptions, generating sign language avatars corresponding to textual descriptions or subtitles, generating textual descriptions, modifying playback or presentation speed, determining messages, generating search results, and the like.

Referring now to other illustrative components depicted as being stored in the data storage 920, the O/S 922 may be loaded from the data storage 920 into the memory 904 and may provide an interface between other application software executing on the remote server 900 and hardware resources of the remote server 900. More specifically, the O/S 922 may include a set of computer-executable instructions for managing hardware resources of the remote server 900 and for providing common services to other application programs (e.g., managing memory allocation among various application programs). In certain example embodiments, the O/S 922 may control execution of the other program module(s) to for content rendering. The O/S 922 may include any operating system now known or which may be developed in the future including, but not limited to, any server operating system, any mainframe operating system, or any other proprietary or non-proprietary operating system.

The DBMS 924 may be loaded into the memory 904 and may support functionality for accessing, retrieving, storing, and/or manipulating data stored in the memory 904 and/or data stored in the data storage 920. The DBMS 924 may use any of a variety of database models (e.g., relational model, object model, etc.) and may support any of a variety of query languages. The DBMS 924 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 900 is a mobile device, the DBMS 924 may be any suitable light-weight DBMS optimized for performance on a mobile device.

Referring now to other illustrative components of the remote server 900, the input/output (I/O) interface(s) 906 may facilitate the receipt of input information by the remote server 900 from one or more I/O devices as well as the output of information from the remote server 900 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 900 or may be separate. The I/O devices may further include, for example, any number of peripheral devices such as data storage devices, printing devices, and so forth.

The I/O interface(s) 906 may also include an interface for an external peripheral device connection such as universal serial bus (USB), FireWire, Thunderbolt, Ethernet port or other connection protocol that may connect to one or more networks. The I/O interface(s) 906 may also include a connection to one or more of the antenna(s) 934 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 900 may further include one or more network interface(s) 908 via which the remote server 900 may communicate with any of a variety of other systems, platforms, networks, devices, and so forth. The network interface(s) 908 may enable communication, for example, with one or more wireless routers, one or more host servers, one or more web servers, and the like via one or more networks.

The antenna(s) 934 may include any suitable type of antenna depending, for example, on the communications protocols used to transmit or receive signals via the antenna(s) 934. Non-limiting examples of suitable antennas may include directional antennas, non-directional antennas, dipole antennas, folded dipole antennas, patch antennas, multiple-input multiple-output (MIMO) antennas, or the like. The antenna(s) 934 may be communicatively coupled to one or more transceivers 912 or radio components to which or from which signals may be transmitted or received.

As previously described, the antenna(s) 934 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 934 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 934 may be configured to transmit or receive radio frequency signals within any suitable frequency range forming part of the unlicensed portion of the radio spectrum.

The antenna(s) 934 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 912 may include any suitable radio component(s) for—in cooperation with the antenna(s) 934—transmitting or receiving radio frequency (RF) signals in the bandwidth and/or channels corresponding to the communications protocols utilized by the remote server 900 to communicate with other devices. The transceiver(s) 912 may include hardware, software, and/or firmware for modulating, transmitting, or receiving—potentially in cooperation with any of antenna(s) 934—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 912 may further include hardware, firmware, or software for receiving GNSS signals. The transceiver(s) 912 may include any known receiver and baseband suitable for communicating via the communications protocols utilized by the remote server 900. The transceiver(s) 912 may further include a low noise amplifier (LNA), additional signal amplifiers, an analog-to-digital (A/D) converter, one or more buffers, a digital baseband, or the like.

The sensor(s)/sensor interface(s) 910 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 914 may be any device configured to generate audible sound. The optional microphone(s) 916 may be any device configured to receive analog sound input or voice data.

It should be appreciated that the program module(s), applications, computer-executable instructions, code, or the like depicted in FIG. 9 as being stored in the data storage 920 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 900, and/or hosted on other computing device(s) accessible via one or more networks, may be provided to support functionality provided by the program module(s), applications, or computer-executable code depicted in FIG. 9 and/or additional or alternate functionality. Further, functionality may be modularized differently such that processing described as being supported collectively by the collection of program module(s) depicted in FIG. 9 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 9 may be implemented, at least partially, in hardware and/or firmware across any number of devices.

It should further be appreciated that the remote server 900 may include alternate and/or additional hardware, software, or firmware components beyond those described or depicted without departing from the scope of the disclosure. More particularly, it should be appreciated that software, firmware, or hardware components depicted as forming part of the remote server 900 are merely illustrative and that some components may not be present or additional components may be provided in various embodiments. While various illustrative program module(s) have been depicted and described as software module(s) stored in data storage 920, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining, by one or more computer processors coupled to memory, a first segment of video content, the first segment comprising a first set of frames, first audio content, and first subtitle data, wherein the first subtitle data comprises a first word associated with a first content entity and a second word associated with a second content entity;
   determining, using a first machine learning model, a first sign gesture associated with the first word;
   determining first motion data associated with the first sign gesture;
   determining first facial expression data;
   generating a first avatar configured to perform the first sign gesture using the first motion data, wherein a first facial expression of the first avatar while performing the first sign gesture is based at least in part on the first facial expression data;
   determining, using the first machine learning model, a second sign gesture associated with the second word;
   determining second motion data associated with the second sign gesture;
   determining second facial expression data; and
   generating a second avatar, distinct in appearance from the first avatar, configured to perform the second sign gesture using the second motion data, wherein a second facial expression of the second avatar while performing the second sign gesture is based at least in part on the second facial expression data.

2. The method of claim 1, further comprising:
   causing the first avatar to be presented as an overlaid graphical representation during playback of the first segment of the video content.

3. The method of claim 1, further comprising:
   determining a first meaning of the first word;
   wherein determining the first sign gesture associated with the first word comprises determining the first sign gesture associated with the first meaning of the first word.

4. The method of claim 1, wherein the first sign gesture is presented by a human in a first video clip, the method further comprising:
   determining, using the first video clip and a second machine learning model, a parameterized model of the human performing the first sign gesture; and
   determining, using the parameterized model, the first motion data to represent the first sign gesture.

5. The method of claim 1, further comprising:
   determining, using the first audio content and a second machine learning model, a sentiment classification associated with audible presentation of the first word;
   wherein determining the first facial expression data comprises determining, using the first set of frames and the sentiment classification, the first facial expression data.

6. The method of claim 1, further comprising:
   causing the first avatar and the second avatar to be presented at least partially concurrently as overlaid graphical representations during playback of the first segment of the video content.

7. The method of claim 1, further comprising:
   determining, using the first set of frames, an actor that speaks the first word; and
   selecting the first avatar based at least in part on an actor identifier associated with the actor.

8. The method of claim 1, further comprising:
   generating a first animated video clip comprising the first avatar performing the first sign gesture with the first facial expression data.

9. The method of claim 8, further comprising:
   generating a second animated video clip comprising the second avatar performing the second sign gesture corresponding to the second word; and
   generating a video file comprising the first animated video clip and the second animated video clip stitched together.

10. The method of claim 1, wherein the first subtitle data comprises a third word, further comprising:
    determining, using the first machine learning model, that a third sign gesture associated with the third word is unavailable;
    determining individual sign gestures corresponding to characters that form the third word; and
    causing the first avatar and the second avatar to perform the individual sign gestures.

11. The method of claim 1, wherein the first avatar has a user-customizable appearance.

12. The method of claim 1, wherein the first avatar is presented instead of subtitles and closed captions during playback of the first segment of the video content.

13. A system comprising:
    memory configured to store computer-executable instructions; and
    at least one computer processor configured to access the memory and execute the computer-executable instructions to:
    determine a first segment of video content, the first segment comprising a first set of frames, first audio content, and first subtitle data, wherein the first subtitle data comprises a first word associated with a first content entity and a second word associated with a second content entity;

determine, using a first machine learning model, a first sign gesture associated with the first word;
determine first motion data associated with the first sign gesture;
determine first facial expression data;
generate a first avatar configured to perform the first sign gesture using the first motion data, wherein a facial expression of the first avatar while performing the first sign gesture is based at least in part on the first facial expression data;
determining, using the first machine learning model, a second sign gesture associated with the second word;
determining second motion data associated with the second sign gesture;
determining second facial expression data; and
generating a second avatar, distinct in appearance from the first avatar, configured to perform the second sign gesture using the second motion data, wherein a second facial expression of the second avatar while performing the second sign gesture is based at least in part on the second facial expression data.

14. The system of claim 13, wherein the at least one processor is further configured to access the memory and execute the computer-executable instructions to:
cause the first avatar to be presented as an overlaid graphical representation during playback of the first segment of the video content.

15. The system of claim 13, wherein the first sign gesture is presented by a human in a first video clip, and wherein the at least one processor is further configured to access the memory and execute the computer-executable instructions to:
determine, using the first video clip and a second machine learning model, a parameterized model of the human performing the first sign gesture; and
determine, using the parameterized model, the first motion data to represent the first sign gesture.

16. The system of claim 13, wherein the at least one processor is further configured to access the memory and execute the computer-executable instructions to:
cause the first avatar and the second avatar to be presented at least partially concurrently as overlaid graphical representations during playback of the first segment of the video content.

17. The system of claim 13, wherein the at least one processor is further configured to access the memory and execute the computer-executable instructions to:
determine, using the first audio content and a second machine learning model, a sentiment classification associated with audible presentation of the first word;
wherein the determination of the first facial expression data is based on the first set of frames and the sentiment classification.

18. The system of claim 13, wherein the at least one processor is further configured to access the memory and execute the computer-executable instructions to:
determine, using the first set of frames, an actor that speaks the first word; and
select the first avatar based at least in part on an actor identifier associated with the actor.

19. The system of claim 13, wherein the first subtitle data comprises a third word, and wherein the at least one processor is further configured to access the memory and execute the computer-executable instructions to:
determine, using the first machine learning model, that a third sign gesture associated with the third word is unavailable;
determine individual sign gestures corresponding to characters that form the third word; and
cause the first avatar and the second avatar to perform the individual sign gestures.

20. The system of claim 13, wherein the first avatar has a user-customizable appearance.

* * * * *